(12) United States Patent
Watanabe et al.

(10) Patent No.: US 6,251,483 B1
(45) Date of Patent: *Jun. 26, 2001

(54) RECYCLABLE COLD CURING AQUEOUS COATING COMPOSITION AND METHOD FOR RECYCLING IT

(75) Inventors: Masakazu Watanabe; Masahiro Yamauchi; Susumu Hibi, all of Osaka-fu; Junichi Sueyoshi, Kyoto-fu, all of (JP)

(73) Assignee: Nippon Paint Co., Ltd., Osaka-Fu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/388,553

(22) Filed: Sep. 2, 1999

(30) Foreign Application Priority Data

Sep. 2, 1998 (JP) .................................................. 10-248193

(51) Int. Cl.$^7$ ........................................................ B05D 3/12
(52) U.S. Cl. ............................. 427/345; 521/40; 523/423
(58) Field of Search .............................. 521/40; 427/435, 427/345; 523/423

(56) References Cited

U.S. PATENT DOCUMENTS

| | | | |
|---|---|---|---|
| 4,151,131 | 4/1979 | Sekmakas et al. ...................... | 260/19 |
| 5,066,690 | 11/1991 | Schmidt et al. ...................... | 523/423 |
| 6,127,001 | * 10/2000 | Hibi et al. ............................. | 427/435 |

FOREIGN PATENT DOCUMENTS

| | | |
|---|---|---|
| 44 15 630 | 11/1995 | (DE) . |
| 0 355 761 | 2/1990 | (EP) . |

* cited by examiner

Primary Examiner—Robert Dawson
Assistant Examiner—D. Aylward
(74) Attorney, Agent, or Firm—Wenderoth, Lind & Ponack, L.L.P.

(57) ABSTRACT

The present invention provides a recyclable cold curing aqueous coating composition, comprising (a) an oxidative-polymerizable, modified epoxy resin with an acid value of 25 to 60, comprising 20 to 70 percents by weight of an epoxy resin based on the total weight of said modified epoxy resin, of which a particle size is not more than 200 nm in an aqueous medium, (b) an anticorrosive pigment and/or an ampholytic metal oxide and (c) a drier. The recyclable cold curing aqueous coating composition of the present invention can provide a coating film having improved water resistance and corrosion resistance, and repeatedly reuse by recycling and readjusting. The present invention also provides a method for recycling the cold curing aqueous coating composition.

9 Claims, 3 Drawing Sheets

RECYCLABLE COLD CURING AQUEOUS COATING COMPOSITION AND METHOD FOR RECYCLING IT

FIELD OF THE INVENTION

The present invention relates to a recyclable cold curing aqueous coating composition and a method for recycling an excess of the aqueous coating composition after applying to an article. Particularly, the present invention relates to a recyclable cold curing aqueous coating composition having a specified formulation, which shows excellent water resistance and corrosion resistance, and a method comprising the steps of collecting the aqueous coating composition in a coating booth by using a collecting solution, filtering the collected coating composition to separate into a concentrated coating composition and a filtrate, and subsequently adjusting the each for recycle use.

BACKGROUND OF THE INVENTION

Aqueous coating compositions having corrosion resistance are generally used as a primer for automobile parts, industrial machines, agricultural machines and the like. When the aqueous coating compositions are applied on a workpiece having poor heat resistance or high heat capacity, the coating compositions have to be dried and cured at a temperature of not more than 80° C. and therefore are generally called as cold curing aqueous coating compositions.

When the cold curing aqueous coating compositions are subjected to spray coating in a coating booth, much amount of paint dust that has not been deposited on a substrate is present. The spray dust is dissolved and dispersed into a booth aqueous solution (that may be called as a collecting solution, hereinafter) in the coating booth to collect. An amount of the collected spray dust in the above way is very large, and if it is disposed by itself, it is waste of paint as well as environmental pollution.

Many efforts to recycle the spray dust collected in the collecting solution have been made, and for example a recycle method is proposed in Japanese Patent Kokai Publication Sho 49 (1974)-51324. The method disclosed in the Japanese Publication comprises collecting the spray dust of the aqueous coating composition with water as a collecting solution to obtain a diluted solution of the aqueous coating composition, filtering the diluted solution through a reverse osmosis membrane or an ultrafiltration membrane, and concentrating and collecting the filtered composition. The concentrated coating composition is then subjected to an adjustment of non-volatile content to a level capable of recycle use. Herein, the "non-volatile" components mean components which are not volatilized away in the aqueous coating composition, including film-forming aqueous resin (such as aqueous alkyd resin and aqueous acrylic resin), pigment and the like.

The method as described in the Kokai Publication, however, has a problem that when filtering and concentrating the diluted solution of the aqueous coating composition with an ultrafiltration membrane, etc., an aqueous solution separated as a filtrate is produced with a very large amount. The collected coating components are reusable, but the aqueous filtrate is generally disposed away. There is a proposal that the aqueous filtrate is returned to the coating booth as the collecting solution and used again for collecting the spray dust.

However, both of the concentrated coating composition and the aqueous filtrate separated from the diluted solution of the aqueous coating composition involve many disadvantages when reusing. For example, since the concentrated coating composition has a reduced volatile content and less amounts of neutralizing amine and solvent, the hydration stability of the resin contained therein decreases, and therefore, an aggregation or separation of the aqueous coating composition may occur. The aqueous filtrate may also aggregate or separate the aqueous coating composition in recycle use.

In order to eliminate the above disadvantages, a method for improving the hydration stability of the resin in recycle use by increasing the hydrophilic property of the resin contained in the original aqueous coating composition is proposed. On applying the above proposal, however, film performances of the coating formed from the aqueous coating composition, such as corrosive resistance, water resistance, and the like, may deteriorate.

SUMMARY OF THE INVENTION

The main object of the present invention is to provide a recyclable cold curing aqueous coating composition having excellent water resistance and corrosive resistance, which improves the efficiency of filtration and concentration of the aqueous coating composition collected with a collecting solution for recycle use (which is called as a diluted solution of the aqueous coating composition hereinafter), without separation and aggregation of the resin or pigments.

Another object of the present invention is to provide a method for recycling the recyclable cold curing aqueous coating composition, wherein a dielectric constant of the collecting solution is controlled to obtain good recyclable properties for a long period.

Accordingly, the present invention provides a recyclable cold curing aqueous coating composition, comprising:

(a) an oxidative-polymerizable, modified epoxy resin with an acid value of 25 to 60, comprising 20 to 70 percents by weight of an epoxy resin based on the total weight of said modified epoxy resin, of which a particle size is not more than 200 nm in an aqueous medium;

(b) an anticorrosive pigment and/or an ampholytic metal oxide; and (c) a drier.

The present invention further provides a method for recycling a recyclable cold curing aqueous coating composition, which comprises the following steps:

i) collecting the cold curing aqueous coating composition which has not been coated on an article in a coating booth by using a collecting solution;

ii) filtering and concentrating the collected coating composition to separate into a concentrated coating composition and a filtrate; and iii) recycling the concentrated coating composition to be used as the recyclable cold curing aqueous coating composition, and recycling the filtrate to be used as the collecting solution, wherein said recyclable cold curing aqueous coating composition comprising:

(a) an oxidative-polymerizable, modified epoxy resin with an acid value of 25 to 60, comprising 20 to 70 percents by weight of an epoxy resin based on the total weight of said modified epoxy resin, of which a particle size is not more than 200 nm in an aqueous medium;

(b) an anticorrosive pigment and/or an ampholytic metal oxide; and (c) a drier, said collecting solution having a dielectric constant of 20 to 70.

Most preferably, in the method for recycling a recyclable cold curing aqueous coating composition as mentioned above, the filtering and concentrating step ii) may be conducted in an ultrafiltration unit.

According to the present invention, the cold curing aqueous coating composition which is recyclable for a long period can be provided by using a certain oxidative-polymerizable, modified epoxy resin.

The present invention provides the cold curing aqueous coating composition which can be repeatedly used for a long period by specifying a resin composition, as well as controlling the dielectric constant of the collecting solution.

REFERENCES CLOSE TO THE PRESENT INVENTION

The Japanese Patent Kokai Publication Hei 6 (1994)-136296, of which the Applicant is the same as one of Applicants of the present application, describes a method for recycling an anti-corrosive aqueous coating composition, which comprises the steps of: controlling an electric conductivity of the aqueous coating composition, filtering a diluted solution of the aqueous coating composition collected with water after coating, and then adjusting the electric conductivity of the filtered coating composition to reuse. The Japanese Kokai Publication describes that the anti-corrosive aqueous coating composition comprises an epoxy resin and a pigment (e.g. a colorant, a filler or an anti-corrosive pigment), but does not disclose that the aqueous coating composition comprises an oxidative-polymerizable, modified epoxy resin as described in the present invention. The aqueous coating composition as described in the Japanese Kokai Publication belongs to a heat-curing aqueous coating composition, but not a cold curing aqueous coating composition. Accordingly, the cold curing aqueous coating composition of the present invention is used in a different curing condition from the aqueous coating composition as described in the Japanese Kokai Publication.

The Japanese Patent Kokai Publication Hei 9 (1997)-164363 describes a method for recycling an anti-corrosive coating composition, which comprises the steps of: spray-coating the anti-corrosive coating composition on an article in a wet coating booth, collecting the sprayed coating composition which has not been coated on the article by using water, and then filtering the collected coating composition through a membrane to separate into the anti-corrosive coating composition and water. This method is characterized by that the step of filtration through the membrane is conducted under such a condition that the collected coating composition has a solid content of 10 to 30 percents by weight and the filtered coating composition has a solid content of 31 to 40 percents by weight. The Japanese Kokai Publication describes that a recycle efficiency of the method increases by filtering the collected coating composition under such condition, and, as described in Examples, that practical examples of the anti-corrosive coating composition used in the method include an oxidative-curing emulsion containing coating composition. The Japanese Kokai Publication describes the anti-corrosive coating composition formulating an oxidative-curing epoxidized ester base resin having an acid value of 40 and a number average molecular weight of 8,000, a drier, carbon black and a baryta. However, the Japanese Kokai Publication does not disclose that what type of the coating composition is efficiently used in the recycling system. The method as described in the Japanese Publication is merely characterized in the filtration and does not disclose also specific examples of the coating composition used in the method.

BRIEF DESCRIPTION OF THE DRAWINGS

These and other objects and features of the aqueous coating composition and the method for recycling it according to the present invention will become apparent from the following description taken in conjugation with the preferred embodiment thereof with reference to the accompanying drawings, in which:

In FIG. 2, each of arrows and numeric letters shows the first, second, third, fourth or fifth peak; In FIG. 3, longitudinal axis expresses the intensity ratio $I_1/I_3$ and transverse axis expresses the dielectric constant $\epsilon$.

DETAILED DESCRIPTION OF THE PREFERRED EMBODIMENTS

Figure 1:
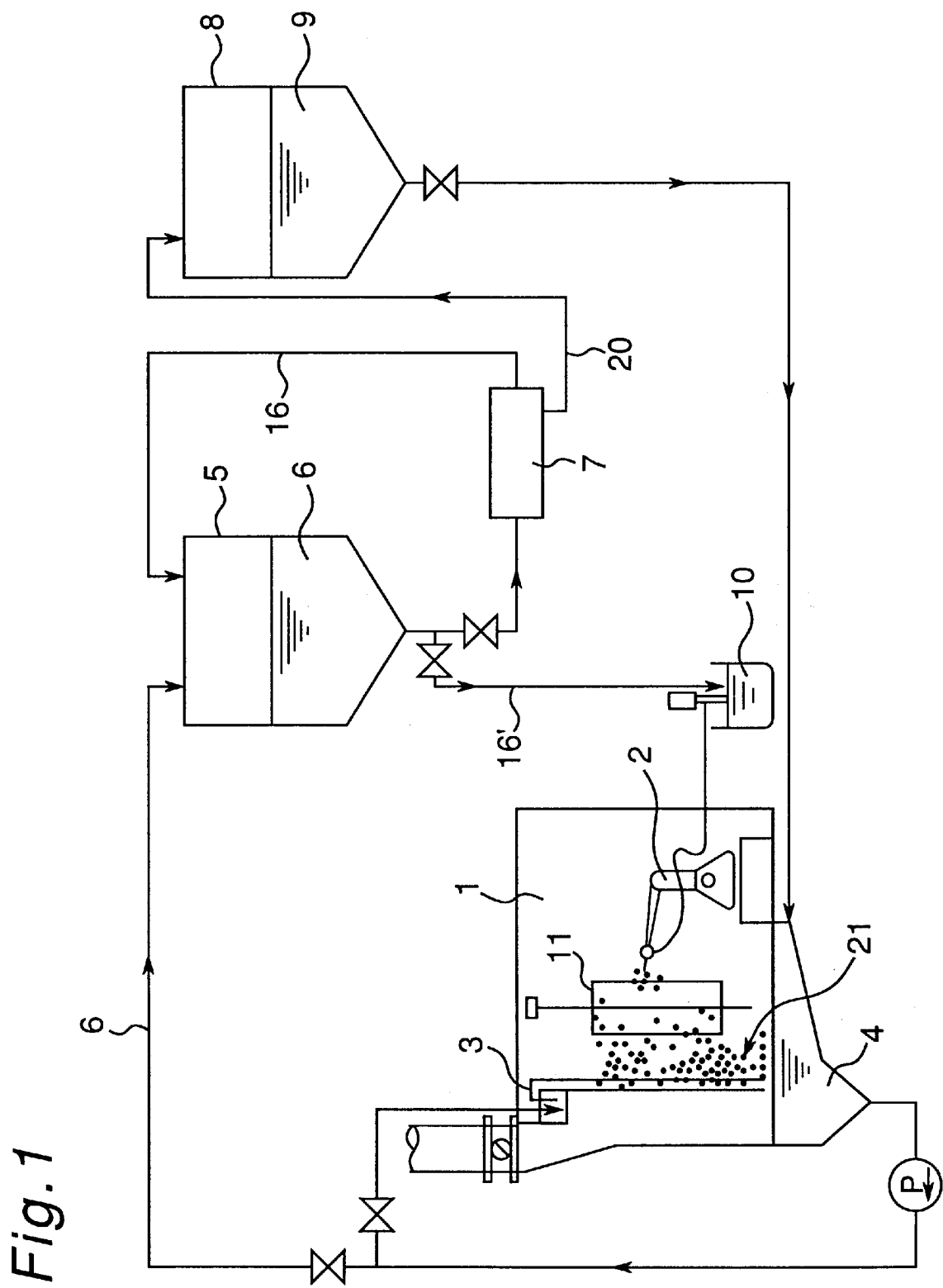
FIG. 1 schematically shows a recycle system generally used in the method for recycling the recyclable cold curing aqueous coating composition according to the present invention.

Example of an oxidative-polymerizable, modified epoxy resin (a) used in the present invention includes an oxidative-polymerizable epoxy resin obtained by reacting an epoxy resin with an unsaturated fatty acid, a phosphate group-containing compound, a sulfonic acid group-containing compound, an alkyd resin or an acrylic monomer to introduce an unsaturated group and an acid group into the epoxy resin. In the present invention, the oxidative-polymerizable, modified epoxy resin (a) may be used in a form of an aqueous dispersion prepared by neutralizing an acid group of the resin (a) and dispersing the neutralized resin into water, an acid value of the resulting resin being 25 to 60, preferably 25 to 55. When the acid value of the resin is above 60, water resistance is poor. When the acid value of the resin is less than 25, the stability for the aqueous coating composition decreases.

The oxidative-polymerizable, modified epoxy resin (a) may be a particle dispersed in an aqueous medium, a particle size of the resin being not more than 200 nm, preferably 20 to 100 nm, more preferably 40 to 100 nm. When the particle size is above 200 nm, the stability of the aqueous coating composition may decrease, and aggregation of the aqueous coating composition may occur in concentrating. The particle size of the resin is most preferably not more than 100 nm because the coating formed from the aqueous coating composition shows excellent water resistance and corrosive resistance. When the particle size is less than 20 nm, an efficiency of filtration becomes poor, but it is also possible in the present invention to use the resin having the smaller particle. To determinate an average particle size of the oxidative-polymerizable, modified epoxy resin (a), so-called light-scattering technique may be applied. In the present invention, the average particle size may be automatically determined by the light-scattering technique. The light-scattering technique can be conducted by diluting a concentration of an aqueous dispersion containing the resin (a) to $1/100$ to $1/1,000$ times with deionized water and subsequently passing the diluted aqueous dispersion through a light-scattering analyzer such as ELS-800 manufactured by OTSUKA ELECTRONICS CO., LTD.

The oxidative-polymerizable, modified epoxy resin (a) comprises an epoxy resin in an amount of 20 to 70 percents by weight, preferably 30 to 60 percents by weight, based on the total weight of the resin (a). When the content of the epoxy resin is less than 20 percents by weight, corrosive resistance of the resulting coating may be poor. When the content is above 70 percents by weight, the stability for the aqueous coating composition decreases.

The oxidative-polymerizable, modified epoxy resin (a) may have preferably an iodine value of 30 to 100,. more preferably 35 to 90. Determination of the iodine value of the resin (a) can be conducted according to Japanese Industrial Standard (i.e. JIS) K-0070. When the iodine value of the resin (a) is less than 30, an oxidative-polymerizability decreases, and therefore, hardness of the resulting coating is poor. On the other hand, when the iodine value of the resin (a) is above 100, the stability for the aqueous coating composition during storage decreases.

The oxidative-polymerizable, modified epoxy resin (a) may be obtained by reacting the epoxy resin with an unsaturated fatty acid, a phosphate group-containing compound, a sulfonic acid group-containing compound, an alkyd resin or an acrylic monomer to introduce both of an unsaturated group and an acid group into the epoxy resin. Examples of the epoxy resin used in the present invention include those which are commercially available, such as EPIKOTE 828, EPIKOTE 1001, EPIKOTE 1002, EPIKOTE 1004, EPIKOTE 1007 and EPIKOTE 1009 (all of which are Bisphenol A type epoxy resins, manufactured by SHELL CHEMICAL CO.), EPOTOHTO YD-128, EPOTOHTO YD-011, EPOTOHTO YD-012, EPOTOHTO YD-014, EPOTOHTO YD-017 and EPOTOHTO YD-019 (all of which are Bisphenol A type epoxy resins, manufactured by TOHTO KASEI CO., LTD.); EPOTOHTO ST-5700 (which is a hydrogenated Bisphenol A type epoxy resin, manufactured by TOHTO KASEI CO., LTD.) and EPOTOHTO YDF-2004 (which is a Bisphenol F type epoxy resin, manufactured by TOHTO KASEI CO., LTD.) and the like. One or not less than two of the resin (a) may be used alone or in combination.

The unsaturated fatty acid can be natural or synthetic. Examples of the unsaturated fatty acid are those which are obtained from tung oil, linseed oil, castor oil, dehydrated castor oil, safflower oil, tall oil, soybean oil or palm oil. One or not less than two of the unsaturated fatty acids may be used alone or in combination.

Examples of the phosphate group-containing compound include inorganic phosphoric acids such as phosphoric acid, diphosphorus pentoxide and the like; and phosphates such as lauryl phosphate, butyl phosphate, polyethylene glycol phosphate and the like.

Examples of the sulfonic acid group-containing compound include inorganic sulfonic acids such as sulfuric acid, sulfurous acid and the like; and organic sulfonic acids such as p-toluene sulfonic acid, nonyl phenyl sulfonic acid and the like.

The alkyd resin may be one having an acid value of at least 30, which is obtained by condensing the unsaturated fatty acid as mentioned above with an art-known hydroxyl group-containing monomer such as neopentyl glycol, trimethylol propane, and the like, and an art-known acid group-containing monomer such as isophthalic acid, phthalic anhydride, trimellitic anhydride, and the like. The alkyd resin should be neutrilized to be water-soluble.

To produce the oxidative-polymerizable, modified epoxy resin (a) by using the acrylic monomer, an epoxidized ester resin is first obtained from the epoxy resin and the unsaturated fatty acid by a conventional method. For example, the epoxidized ester resin may be obtained by reacting the epoxy resin with the unsaturated fatty acid in the presence of a condensation catalyst in a suitable solvent (e.g. toluene, xylene, and the like) at a temperature of 150° C. to 250° C., if necessary, under an atmosphere of an inert gas such as nitrogen gas, etc., until a desired acid value is obtained. The condensation catalyst includes dibutyltin oxide, tetra-n-butylammonium bromide and the like.

The epoxidized ester resin is reacted with an ehtylenically unsaturated monomer to produce an acrylic group-modified epoxidezed ester resin. Examples of the ehtylenically unsaturated monomer include styrene, unsaturated carboxylic acid such as (meth)acrylic acid, maleic anhydride and itaconic acid, etc., (meth)acrylates, and the mixture thereof. Among them, at least one of the acrylic group-containing monomers should have a carboxyl group. One or not less than two of the monomers may generally be used in combination with styrene.

The reaction of the epoxidized ester resin with the ehtylenically unsaturated monomer can be conducted in the presence of a polymerization initiator at a temperature of 80° C. to 150° C. under an atmosphere of an inert gas (e.g. nitrogen gas, etc.) until a desired acid value of the product is obtained.

The polymerization initiator employed for the above reaction of the epoxidized ester resin and the ehtylenically unsaturated monomer can be one which is conventionally known in the art, such as peroxides, azo-compounds and the like. Typical example of the initiator is KAYABUTYL B (one of alkyl peresters), which is commercially available from KAYAKU AKZO. The initiator may be used in an amount of 0.1 to 20 percents by weight based on the total weight of the monomers employed in the reaction.

The acrylic group-modified epoxidized ester resin obtained from the reaction may be dispersible into water by neutralizing the acid group thereof with a suitable neutralizing agent. Examples of the neutralizing agent include ammonia, monomethylamine, dimethylamine, trimethylamine, monoethylamine, diethylamine, triethylamine, mono-n-propylamine, dimethyl-n-propylamine, monoethanolamine, dimethanolamine, triethanolamine, N-methyl ethanolamine, N-methyl diethanolamine, dimethyl ethanolamine, isopropanolamine, diisopropanolamine, and the like. Triethylamine, dimethyl ethanolamine and the like are more preferable.

Among the oxidative-polymerizable, modified epoxy resins, one which is prepared by reacting the epoxy resin with the unsaturated fatty acid and then further reacting the product with the acrylic monomer is the most preferable. Using the resulting resin results in more improved stability of the aqueous coating composition during storage and more increased efficiency for filtration.

An anticorrosive pigment having an electric conductivity of not more than 600 $\mu$S/cm may be preferably used as one of component (b) in the aqueous coating composition of the present invention. The electric conductivity is defined as water solubility of an aqueous dispersion prepared by dispersing one gram of the anticorrosive pigment into 100 mL of water, followed by leaving it for 5 days, which can be determined by using an electric conductivity analyzer. Any one of the anticorrosive pigments having the electric conductivity of not more than 600 $\mu$S/cm can be used in the present invention. When the electric conductivity is less than 30 $\mu$S/cm, a concentration of an effective component for corrosive resistance contained in the aqueous coating composition decreases. In case of that, although the water resistance and an inhibiting ability for generating blisters of the aqueous coating composition are improved, the corrosive resistance deteriorates. Thus, the electric conductivity of the anticorrosive pigment (b) preferably ranges from 30 $\mu$S/cm to 600 $\mu$S/cm. In addition, the anticorrosive pigment (b) preferably has a pH of 6 to 9.

Desirable examples of the anticorrosive pigment (b) having the electric conductivity of 30 $\mu$S/cm to 600 $\mu$S/cm include a phosphate anticorrosive pigment such as calucium phosphate (e.g. LF BOUSEI CP-Z which is commercially available from KIKUCHI SHIKISO Co., etc.) and zinc phosphate (e.g. Sicor-NOP which is commercially available from BASF Corporation, etc.); molybdate anticorrosive pigments such as zinc molybdate (e.g. LF BOUSEI M-PSN which is commercially available from KIKUCHI SHIKISO CO., MOLYWHITE 101 which is commercially available from HONSYO CHEMICAL CO., etc.) and the like; and the other compound such as an nitrozinc complex (Sicorin-RZ which is commercially available from BASF CORPORATION) and cyanamidezinc calcium complex (e.g. LF BOUSEI ZK-S2 which is commercially available from KIKUCHI SHIKISO CO., HALOX SZP-39 which is commercially available from HAMMOND LEAD PRODUCT INC., etc.), and the like.

The anticorrosive pigment (b) may be contained in the aqueous composition in an amount of 0.1 to 20 parts by weight, preferably 1 to 10 parts by weight, more preferably 2 to 10 parts by weight, based on 100 parts by weight of the oxidative-polymerizable, modified epoxy resin (a) as a solid content. When the amount of the anticorrosive pigment is less than 0.1 parts by weight, corrosive resistance of the resulting coating formed from the aqueous coating composition is poor. When the amount is above 20 parts by weight, the water resistance of the coating deteriorates.

An ampholytic metal oxide (b) contained in the aqueous coating composition of the present invention is an oxide which acts as acid to a basic compound or as base to an acid compound. Specific examples of the ampholytic metal oxides include aluminum oxide, zinc oxide, ferrous oxide, tin oxide, and the like, and the most preferable is zinc oxide. The ampholytic metal oxide (b) has an electric conductivity of not more than 600 $\mu$S/cm, preferably not more than 30 $\mu$S/cm. When the electric conductivity is above 600 $\mu$S/cm, the stability of the aqueous coating composition decreases.

The water resistance of the coating composition can be improved since the ampholytic metal oxide (b) generally absorbs an acid group (e.g. carboxylic acid, phosphoric acid, and the like) in the resulting coating. The ampholytic metal oxide (b) is also more effective for improving water resistance and corrosive resistance of the resulting coating than the anticorrosive pigment. In the aqueous coating composition of the present invention, the ampholytic metal oxide may be contained in amount of 0.1 to 15 parts by weight, preferably 1 to 15 parts by weight, most preferably 2 to 10 parts by weight, based on 100 parts by weight of the oxidative-polymerizable, modified epoxy resin (a) as a solid content. When the content of the ampholytic metal oxide is less than 0.1 parts by weight, water resistance of the resulting coating can not be improved. When the content is above 15 parts by weight, the stability of the aqueous coating composition decreases.

The ampholytic metal oxide as above mentioned also includes one which is used as a conventional filler. When using the ampholytic metal oxide as a filler, it is generally contained in a large amount, i.e. in an amount of at least 20 parts by weight based on 100 parts by weight of the oxidative-polymerizable, modified epoxy resin (a) as a solid content. However, when using as an additive to improve the water resistance and the corrosive resistance of the resulting coating in the present invention, the content of the ampholytic metal oxide may be not more than 15 parts by weight.

The cold curing aqueous coating composition of the present invention comprises a drier(c). The drier (c) refers to a compound which acts to cut a cold oxidation drying period, such as generally a lead, manganese or cobalt containing compound. Specific examples of the drier (c) include the cobalt containing compound such as COBALT-HYDROCURE II (commercially available from SAN NOPCO LIMITED), DICNATE 1000W, Co-NAPHTHENATE 5% W, DICNATE 3111 (both of which are commercially available from DAINIPPON INK & CHEMICALS, INC.); the manganese containing compound such as Mn- NAPHTHENATE 5% (commercially available from DAINIPPON INK & CHEMICALS, INC.), Mn-OCTOATE 8% (commercially available from DAINIPPON INK & CHEMICALS, INC.); and the lead containing compound such as Pb-NAPHTHENATE 15%, Pb-OCTOATE 8% (both of which are commercially available from DAINIPPON INK & CHEMICALS, INC.), and the like. In the aqueous coating composition of the present invention, the content of the drier (c) may be an art-known amount, i.e. 0.01 to 5 parts by weight, preferably 0.01 to 2 parts by weight, more preferably 0.02 to 2 parts by weight, based on 100 parts by weight of the oxidative-polymerizable, modified epoxy resin (a) as a solid content. When the content is less than 0.01 parts by weight, an effect for accelerating to dry the resulting coating can not be accomplished. When the amount is above 5 parts by weight, the stability of the aqueous coating composition decreases.

The cold curing aqueous coating composition of the present invention also comprises a colorant and a filler other than the anticorrosive pigment, or an antifoaming agent, an extender, and the like, as additives. These additives including the colorant and the filler may generally be contained in an amount of 0.01 to 200 parts by weight based on 100 parts by weight of the oxidative-polymerizable, modified epoxy resin (a) as a solid content, but not being limited thereto.

The cold curing aqueous coating composition of the present invention comprises an aqueous medium. The aqueous medium consists essentially of water and may comprise a water-soluble organic solvent, an organic solvent which is miscible with the water-soluble organic solvent, a surfactant and the like. These organic solvents and the surfactant will particularly be described in connecting with a collecting solution, hereinafter.

By reference to FIG. 1, the method according to the present invention will be explained in detail. FIG. 1 schematically shows a recycle system generally used in the method for recycling the cold curing aqueous coating composition according to the present invention.

In the step i) of the method of the present invention, the cold curing aqueous coating composition as mentioned hereinbefore is first spray coated to an article 11 by using a spray gun 2 in a coating booth 1. And then, an excess of the sprayed coating composition 21 which has not been coat ed on the article 11 may be collected by using a water curtain 3 consisting of a collecting solution 4. Hereinafter, a collected solution 21 with the collecting solution 4, i.e. a solution comprising the collecting solution and the sprayed coating composition, is called as a diluted solution of the aqueous coating composition 6. The diluted solution of the aqueous coating composition 6 is sent to a concentrating tank 5 and then introduced to an ultrafiltration unit 7 to separate to a concentrated coating composition 16 and a filtrate 20 (the step ii). The concentrated coating composition 16 is repeatedly passed through the ultrafiltration unit 7 to concentrate until a suitable solution viscosity for coating is obtained, and then, a final concentrated coating composition 16' is obtained. At the same time of filtrating and concentrating, the filtrate 20 obtained by filtrating may be collected as a solution 9 into a tank 8.

Subsequently, the final concentrated coating composition 16' is sent to a coating tank 10. A formulation and a concentration thereof, etc., of the final concentrated coating composition 16' are adjusted to optimize. For example, an optimal particle size is not more than 30 $\mu$m, an optimal loss of gloss of the adjusted coating composition to the original coating composition is not more than 10 percents, and the like. After adjusting, the optimal vales are checked to reuse the final concentrated coating composition 16' as the cold curing aqueous coating composition. If necessary, the filtrate 9 may be reused as the collecting solution 4 after adjusting the dielectric constant to a range between 20 and 70, preferably between 30 and 70, by using additives generally used in the collecting solution and a value of pH to a range between 8 and 10. To adjust pH of the filtrate 9, any neutralizing agents used for neutralizing the modified epoxy resin as mentioned hereinbefore may be used.

The collecting solution is referred to as an aqueous solution used for collecting an excess of the sprayed coating composition which has not been coated on the article 11. In the method of the present invention, the collecting solution having the dielectric constant of 20 to 70 may be used, as mentioned hereinbefore. When the dielectric constant is above 70, precipitation or aggregation may occur in concentrating since dispersion of the sprayed coating composition into the collecting solution is not conducted stably, and therefore, the stability of the concentrated coating composition decreases. When the dielectric constant is less than 20, since it may take longer time in filtrating and concentrating, an efficiency of filtration and concentration is poor.

It has not been found that why the dielectric constant of the collecting solution has an effect on the efficiency of filtration and concentration. However, since the step ii) for filtrating and concentrating is progressed by permeating the collecting solution through a conventional filtration unit (i.e. the ultrafiltration unit), a rate for permeating, that is the efficiency of filtration and concentration, may generally be controlled depending on characteristics of the collecting solution. In view of the use of the dielectric constant as the characteristics, filtrating and concentrating can be conducted stably when the dielectric constant of the collecting solution is lower than that of water, i.e. a value is between 20 and 70, and therefore, the efficiency of filtration and concentration may be improved. The collecting solution having lower dielectric constant than water is hydrophobic. Thus, the lower the dielectric constant is, the more hydrophobic the collecting solution is.

The dielectric constant of the collecting solution should be adjusted to the desirable value as mentioned hereinabove. Examples of materials added into the collecting solution in adjusting include a water-soluble organic solvent, an organic solvent which is miscible with the water-soluble organic solvent, a surfactant, a resinous varnish used as a starting material in the recyclable cold curing aqueous coating composition, and the like. A mixture thereof can be also used.

Examples of the water-soluble organic solvent include alcohols such as methanol, ethanol, 1-butanol, 2-propanol, 2-butanol, 2-methyl-2-propanol, methoxy propanol, ethoxy propanol, butyl glycol, sorbitol, butyl diglycol, diacetonealcol, diethylene glycol, an the like; ketones such as acetone, methyl ethyl ketone, and the like; ethers such as tetrahydro furan, dioxane and the like; amines such as dimethyl ethanolamine, diethanolamine, diethylamine; and pyrrolidones such as pyrrolidone, n-methyl pyrrolidone, and the like. The water-soluble organic solvent can be formulated in the collecting solution in an amount of not more than 20 percents by weight, preferably not more than 15 percents by weight, based on the total weight of the collecting solution. When the content of the water-soluble organic solvent is above 20 percents by weight, an efficiency of concentrating decreases.

Examples of the organic solvent which is miscible with the water-soluble organic solvent include hydrocarbons such as hexane, white kerosene, benzene, toluene, xylene, SOLVESSO 100 (an organic solvent: commercially available from SHOEI CHEMICAL Co.); esters such as ethyl acetate, butyl acetate, methoxy propanol acetate and the like; ketones such as methyl isobutyl ketone and the like; ethers such as diethylether, dibutylether and the like; and amines such as triethylamine, tributylamine, dibutylamine and the like. The organic solvent can be formulated in the collecting solution in an amount of not more than 10 percents by weight, preferably not more than 5 percents by weight, based on the total weight of the collecting solution. When the content of the organic solvent is above 10 percents by weight, the organic solvent may be separated from the collecting solution.

Examples of the surfactants used for adjusting the dielectric constant of the collecting solution include a nonionic surfactant such as polyethylene oxide, polypropylene oxide, or a copolymer thereof, or NEWCOL 526 (containing alkyl polyether in an amount of 70% by weight based on the total weight thereof; which is commercially available from NIHON NYUKAZAI CO.); an anioic surfactant such as ammonium stearate, potassium palmitate, and the like. The surfactant can be formulated in the collecting solution in an amount of not more than 5 percents by weight, preferably 0.1 to 2 percents by weight, based on the total weight of the collecting solution. When the content of the surfactant is above 5 percents by weight, water resistance of the resulting coating may decrease.

The resinous varnish used as a starting material in the recyclable cold curing aqueous coating composition can be formulated in the collecting solution in an amount of not more than 5 percents by weight, preferably 0.1 to 2 percents by weight, based on the total weight of the collecting solution. When the content of the resinous varnish is above 5 percents by weight, the formulation of the collected coating composition may change, and therefore, a coating ability can not be reproducible.

Among them, preferable is the organic solvent having a boiling point of 60° C. to 240° C. When the boiling point is less than 60° C., the solvent may be easily volatile, and therefore, the dielectric constant of the collecting solution increases. When the boiling point is above 240° C., in reuse of the readjusted coating composition, the organic solvent remains in the resulting coating and adversely affects the workability.

Among the organic solvents as mentioned hereinabove, the most preferable are amines. Amines may act as the organic solvent as well as neutralize an acid of the resin comprised in the sprayed coating composition to increase the water-solubility, and therefore, accelerate to dissolve the excess sprayed coating composition into the collecting solution.

In the collecting solution, the same starting materials as the starting materials used for preparing the cold curing aqueous coating composition as mentioned hereinbefore, such as the solvent, additives or the resinous varnish, are preferably used. By using such materials, the formulation of the coating composition in filtrating and concentrating may hardly change, and therefore, the coating composition may have more reproducible performances. The dielectric constant of the collecting solution can be determined as follows: a fluorescent molecule (which is called as a fluorescent exploratory material) is added into the organic solvent or water having the well known dielectric constant (which is generally called as a standard solvent) to measure a fluorescence spectrum to obtain a relationship (i.e. a calibration curve) between factors of the fluorescence spectrum (such as wavelength, intensity, etc.) and the dielectric constant of the organic solvent. A fluorescence spectrum of the collecting solution is then measured, and the factors of the fluorescence spectrum of the collecting solution are assigned to the resulting calibration curve to obtain the dielectric constant. Herein, the fluorescent exploratory material is referred to as a material which can illuminate a light having another wavelength other than a certain wavelength of a irradiation light thereto. The material can be generally added into a experimental subject in a small amount to determine physical and/or chemical properties of the subject. Examples of the material include an aromatic compound which can illuminate a fluorescence having wavelength within a range of a visible or ultraviolet spectrum, preferably a polycyclic aromatic compound. More preferably is a fused polycyclic aromatic compound, such as naphthalene, naphthol, anthracene, hydroxy anthracene, phenanthrene, hydroxy phenanthrene, pyrene, azurene, phenylene, and a fluorescent compound having a structural nuclear thereof; anilinonaphthalenes, e.g. an anilinonaphthalene structural nuclear-containing compound such as anilinonaphthalene, anilinonaphthalene sulfonic acid, dimethyl anilinonaphthalen, etc.; anilinophenanthrene, e.g. an anilinophenanthrene structural nuclear-containing compound such as anilinophenanthrene, anilinophenanthrene sulfonic acid, dimethyl anilinophenanthrene, diethyl anilinophenanthrene, methylethyl anilinophenanthrene, methyl-hydroxyethyl anilinophenanthrene, dihydroxyethyl anilinophenanthrene, etc.; and the like. For the method for determining the dielectric constant, the standard solvent should be a solvent having a well known dielectric constant, including an organic solvent such as methanol, ethanol, 1-propanol, 2-propanol, 1-butanol, and the like, and water.

A filtrating and concentrating installment 7 used in the present invention, which expressed by an ultrafilter in FIG. 1, may be an ultrafiltration unit.

The recyclable cold curing aqueous coating composition according to the present invention comprises the oxidative-polymerizable, modified epoxy resin and the anticorrosive pigment and/or an ampholytic metal oxide so that the water resistance and corrosion resistance of the resulting coating can be improved. According to the present invention, recycling the coating composition can be maintained for a longer period by applying the coating composition into the coating recycle system and using the collecting solution having a given dielectric constant.

EXAMPLES

The following Examples, Comparative Examples, Production Examples and Comparative Production Examples further illustrate the present invention in detail but are not to be construed to limit the scope thereof.

Production Example 1

A reaction vessel was charged with 609.2 parts by weight of EPIKOTE 1001 (a bisphenol A epoxy resin, which is manufactured by SHELL CHEMICAL Co.), 295.4 parts by weight of dehydrated castor oil fatty acid, 295.4 parts by weight of safflower oil fatty acid and 24.0 parts by weight of xylol for circulating, and condensation-reacted for about 10 hours at a temperature of 210° C. under an atmosphere of a nitrogen gas with agitating until an acid value of a condensed product reached to 3.7. After finishing the reaction, 500 parts by weight of butyl cellosolve was added to dilute the reactant to obtain an epoxidized ester rein (Ep-1) having a nonvolatile content of 68.8 percents by weight and an acid value of 3.7.

A reaction vessel was charged with 1,008 parts by weight of epoxidized ester rein (Ep-1) and 153.6 parts by weight of butyl cellosolve and heated to a temperature of 140° C. At 140° C., 316.8 parts by weight of styrene, 62.4 parts by weight of acrylic acid and 9.10 parts by weigh of a polymerization initiator (KAYABUTYL B, which is commercially available from KAYAKU AKZO) were added dropwise to the reactant over 3 hours. After finishing addition, the reactant was aged for 0.5 hours. Then, 2.27 parts by weight of the polymerization initiator (KAYABUTYL B, which is commercially available from KAYAKU AKZO) was added dropwise to the reaction vessel and aged for further 1.5 hours to yield an acrylic group-modified epoxy resin (a) having an iodine value of 40, an acid value of 46.4, an epoxy resin content of about 32 percents and a nonvolatile content of 69.6 parts by weight.

The resulting resin (a) was neutralized 100% with triethylamine, and then, dispersed into water to obtain an emulsion resin having a nonvolatile content of 35 percents by weight. The particle size of the emulsion resin determined by a light-scattering technique was 80 nm.

Example 1

60.0 Parts by weight of the emulsion resin obtained from the Production Example 1, 0.1 parts by weight of a deforming agent (a silica-mineral oil deforming agent: NOPCO 8034L, which is manufactured by SAN NOPCO LIMITED), 31.5 parts by weight of a colorant (titanium dioxide: CR-95, which is manufactured by ISHIHARA SANGYO KAISHA, LTD.), 0.6 parts by weight of a drier (a cobalt containing compound: DICNATE 1000W, which is manufactured by DAINIPPON INK & CHEMICALS, INC.), 2.0 parts by weight of an anticorrosive pigment (LF BOUSEI ZP-SB which is commercially available from KIKUCHI SHIKISO CO.) and 8.0 parts by weight of water were mixed to obtain a cold curing aqueous coating composition (A).

Production Example 2

A reaction vessel was charged with 727.7 parts by weight of EPIKOTE 1001 (a bisphenol A epoxy resin, which is manufactured by SHELL CHEMICAL CO.), 232.8 parts by weight of dehydrated castor oil fatty acid, 239.5 parts by weight of tall oil fatty acid, 1.9 parts by weight of tetra-n-butyl ammonium bromide and 12.0 parts by weight of xylol for circulating, and condensation-reaction was conducted for about 5 hours at a temperature of 200° C. under an atmosphere of a nitrogen gas with agitating until an acid value of a condensed product reached to 2.7. After finishing the reaction, an epoxidized ester rein (Ep-2) having a nonvolatile content of 99.0 percents by weight and the acid value of 2.7 was obtained. 203.4 Parts by weight of epoxidized ester rein (Ep-2) and 24.3 parts by weight of butyl cellosolve were charged into a reaction vessel and heated to a temperature of 140° C. At 140° C., 59.4 parts by weight of styrene, 11.7 parts by weight of acrylic acid and 2.28 parts by weigh of a polymerization initiator (KAYABUTYL B, which is commercially available from KAYAKU AKZO) were added dropwise to the reactant over 3 hours. After finishing addition, the reactant was aged for 0.5 hours. Then, 0.57 parts by weight of the polymerization initiator (KAYABUTYL B, which is commercially available from KAYAKU AKZO) and 91.6 parts by weight of butyl cellosolve were added dropwise to the reaction vessel and then aged for further 1.5 hours to obtain an acrylic group-modified epoxy resin (b) having an iodine value of 35, an acid value of 30.5, an epoxy resin content of about 45 percents and a nonvolatile content of 70 parts by weight.

The resulting resin (b) was neutralized 100% with dimethyl ethanolamine, and then, dispersed into water to obtain an emulsion resin having a nonvolatile content of 35 percents by weight. The particle size of the emulsion resin determined by a light-scattering technique was 75 nm.

Example 2

A cold curing aqueous coating composition (B) was prepared in the same way as described in Example 1, except that 60.0 parts by weight of the emulsion resin obtained from Production Example 2 was employed and 1.0 parts by weight of an ampholytic metal oxide (ZINC OXIDE II, which is manufactured by SAKAI CHEMICAL INDUSTRY CO. LTD.) was employed instead of 2.0 parts by weight of the anticorrosive pigment.

Production Example 3

738.2 Parts by weight of EPOTOHTO YD-012 (which is Bisphenol A type epoxy resin, manufactured by TOHTO KASEI CO., LTD.), 690.5 parts by weight of linseed oil fatty acid, 1.4 parts by weight of dibutyltin oxide and 42.0 parts by weight of xylol for circulating were charged into a reaction vessel, and condensation-reacted for about 6 hours at a temperature of 210° C. to 240° C. under an atmosphere of a nitrogen gas with agitating until an acid value of a condensed product reached to 4.4. After finishing the reaction, 42 parts by weight of butyl cellosolve was added to the reaction product to obtain an epoxidized ester rein (Ep-3) having a nonvolatile content of 95.7 percents by weight and the acid value of 4.4.

Then, an acrylic group-modified epoxy resin (c) having an iodine value of 75, an acid value of 42.2, an epoxy resin content of 46 percents and a nonvolatile content of 70 parts by weight was prepared in the same way as Production Example 2, except that 271.2 parts by weight of epoxidized ester rein (Ep-3) instead of 203.4 parts by weight of epoxidized ester rein (Ep-2), and 121.4 parts by weight of butyl cellosolve, 4.0 parts by weight of styrene, 15.6 parts by weight of acrylic acid and 1.44 parts by weight and another 0.16 parts by weight of a polymerization initiator (KAYABUTYL B, which is commercially available from KAYAKU AKZO) were used.

The resulting resin (c) was neutralized 100% with triethylamine, and then, dispersed into water to obtain an emulsion resin having a nonvolatile content of 35 percents by weight. The particle size of the emulsion resin determined by a light-scattering technique was 60 nm.

Example 3

80.0 Parts by weight of the emulsion resin obtained from the Production Example 3, 0.1 parts by weight of a deforming agent: NOPCO 8034L, 20.0 parts by weight of a filler (talc: LMS-300, which is manufactured by FUJI TALC CO.), 20.0 parts by weight of a filler (barium sulfate: B-34, which is manufactured by SAKAI CHEMICAL INDUSTRY CO. LTD.), 2.0 parts by weight of a colorant (carbon black: MITSUBISHI CARBON MA-100, which is manufactured by MITSUBISHI CHEMICAL), 0.2 parts by weight of an anti-drying agent (methyl ethyl ketoxime: DISPARLON No.501, which is manufactured by KUSUMOTO CHEMIKALS), 1.0 part by weight of a drier (a cobalt containing compound: DICNATE 3111, which is manufactured by DAINIPPON INK & CHEMICALS, INC.), 2.5 parts by weight of ZINC OXIDE II (which is manufactured by SAKAI CHEMICAL INDUSTRY CO. LTD.) and 10.0 parts by weight of water were mixed to yield a cold curing aqueous coating composition (C).

Production Example 4

456.8 Parts by weight of EPIKOTE 828 (a bisphenol A epoxy resin, which is manufactured by SHELL CHEMICAL CO.), 366.3 parts by weight of dehydrated castor oil fatty acid, 376.8 parts by weight of tall oil fatty acid and 12.0 parts by weight of xylol for circulating were charged into a reaction vessel, and condensation-reacted for about 10 hours at a temperature of 210° C. to 230° C. under an atmosphere of a nitrogen gas with agitating until an acid value of a condensed product reached to 3.4. After finishing the reaction, an epoxidized ester rein (Ep-4) having a nonvolatile content of 99.0 percents by weight and the acid value of 3.4 was obtained.

1,200 Parts by weight of epoxidized ester rein (Ep-4) and 676.8 parts by weight of butyl cellosolve were charged into a reaction vessel and heated to a temperature of 140° C. At 140° C., 289.8 parts by weight of styrene, 89.4 parts by weight of acrylic acid and 9.10 parts by weigh of a polymerization initiator (KAYABUTYL B, which is commercially available from KAYAKU AKZO) were added dropwise to the reactant over 3 hours. After finishing addition, the reactant was aged for 0.5 hours. Then, 2.27 parts by weight of the polymerization initiator (KAYABUTYL B, which is commercially available from KAYAKU AKZO) was added dropwise to the reaction vessel and then aged for further 1.5 hours to yield an acrylic group-modified epoxy resin (d) having an iodine value of 58, an acid value of 40.0, an epoxy resin content of 29 percents and a nonvolatile content of 69.6 parts by weight.

The resulting resin (d) was neutralized 100% with triethylamine, and then, dispersed into water to obtain an emulsion resin having a nonvolatile content of 35 percents by weight. The particle size of the emulsion resin determined by a light-scattering technique was 150 nm.

Example 4

A cold curing aqueous coating composition (D) was prepared in the same way as described in Example 1, except that the emulsion resin obtained from Production Example 4 but Production Example 1 was used, and that 31.5 parts by weight of titanium dioxide was changed to 29 parts by weight of precipitated barium sulfate 100 (which is manufactured by SAKAI CHEMICAL INDUSTRY CO. LTD.) and 2.5 parts by weight of carbon black (MITSUBISHI CARBON MA-100, which is manufactured by MITSUBISHI CHEMICAL).

Production Example 5

The following ingredients were charged to a reaction vessel equipped with a stirrer, a temperature control unit and a decanter, and heated with stirring.

| Ingredients | Amounts |
| --- | --- |
| Soybean fatty acid | 40 parts by weight |
| Isophthalic acid | 20 parts by weight |
| Trimellitic anhydride | 9 parts by weight |
| Trimethylol propane | 30 parts by weight |
| Xylene | 1 part by weight |
| Dibutyltin oxide | 0.02 parts by weight |

Water produced in the reaction was eliminated from the reactant by azeotropic distillation with xylene and maintained heating until an acid value of the product was 65. Then, the reaction was finished.

To the reaction vessel, 35 parts by weight of EPOTOHTO YD-012 (a Bisphenol A type epoxy resin, manufactured by TOHTO KASEI CO., LTD.) was added and reacted at a temperature of 150° C. to 160° C. with siring until the acid value of the product was 40. After the reaction was finished, 52 parts by weight of butyl cellosolve was added thereto to obtain an alkyd-group modified epoxy resin (e) having an iodine value of 36, a nonvolatile content of 72, an epoxy resin content of 26 percents and a Gardner viscosity of 25.

To 139 parts by weight of the resulting resin (e), 6.3 parts by weight of dimethyl ethanolamine was added with stirring, and then diluted with deionized water to obtain a resinous varnish having a nonvolatile content of 40 percents by weight. The particle size of the resinous varnish determined by a light-scattering technique was 180 nm.

Example 5

A cold curing aqueous coating composition (E) was prepared in the same way as described in Example 1, except that the resulting resinous varnish obtained from the Production Example 5 was used instead of the emulsion resin obtained from Production Example 1.

Comparative Production Example 1

The following ingredients were charged to a reaction vessel equipped with a stirrer, a temperature control unit and a decanter, and heated with stirring.

| Ingredients | Amounts |
| --- | --- |
| Soybean fatty acid | 34 parts by weight |
| Isophthalic acid | 25 parts by weight |
| Trimellitic anhydride | 9 parts by weight |
| Trimethylol propane | 31 parts by weight |
| Xylene | 1 part by weight |
| Dibutyltin oxide | 0.02 parts by weight |

Water produced by the reaction was eliminated from the reactant by azeotropic distillation with xylene and maintained heating until an acid value and a hydroxyl value of the product was 50 and 125, respectively. Then, the reaction was finished. The product was diluted with butyl cellosolve to obtain an alkyd resinous varnish having a nonvolatile content of 73 percents by weight. Gardner viscosity of the alkyd resinous varnish was $Z_2$ and solubility parameter thereof was 10.37. The alkyd resinous varnish was neutralized 100% with dimethyl ethanolamine and diluted with deionized water to obtain an aqueous alkyd resinous varnish having a nonvolatile content of 40 percents by weight. The electric conductivity of the aqueous alkyd resinous varnish was 1,510 $\mu$S/cm.

The resulting aqueous alkyd-group modified resinous varnish was diluted with ion exchanged water to obtain an aqueous diluted resin having a nonvolatile content of 15 percents by weight, and then ultrafiltrated at a temperature of 25° C. to 30° C. by using EW4026, which is manufactured by DEZARINATION SYSTEMS CO., as an ultrafiltration membrane to prepare an aqueous alkyd resinous varnish having an iodine value of 40 and a nonvolatile content of 40 percents by weight. The electric conductivity of the resulting aqueous alkyd resinous varnish was 845 $\mu$S/cm. The particle size of the resinous varnish determined by a light-scattering technique was 25 nm.

Comparative Example 1

30 Parts by weight of titanium dioxide (CR-97; which is manufactured by ISHIHARA SANGYO KAISHA, LTD.) was dispersed into 100 parts by weight of the aqueous alkyd resinous varnish by using a laboratory mixer to prepare an aqueous coating composition. 10 Parts by weight of LF BOUSEI CP-Z which is commercially available from KIKUCHI SHIKISO CO. and 2 parts by weight of a drier: DICNATE 3111 were formulated into the aqueous coating composition.

Example 6

Evaluation of Recycling property of the coating compositions

The coating composition obtained from Example 1 was diluted with deionized water to be a solution viscosity with NK 2 cup of 30 seconds. The solid content of the diluted coating composition was 58 percents. The diluted coating composition was blown into a collecting solution having a value of pH of 9.0 (of which the dielectric constant was previously adjusted to 65 with butyl cellosolve and dimethyl ethanolamine) by air-spray coating technique until the solid content of the collecting solution reached to 10 percents. The collecting solution containing the coating composition was filtered and concentrated by ultrafiltration to obtain a concentrated coating composition having a solution viscosity with NK 2 cup of 30 seconds. The concentrated coating composition had a solid content of 60 percents by weight.

A time taken to reach to a given solid content of the coating composition during concentrating and the solid content and coating properties (a particle size of the coating composition, expressed in $\mu$m) of the concentrated coating composition on finishing concentrating are shown in Table 1.

Examples 7 to 10 and Comparative Examples 2 to 4

The diluted solution of the coating compositions were prepared, filtered and concentrated in the same way as described in Example 6, except that the coating compositions obtained from Examples 2 to 5 were used. Example 6 was repeated to measure each particle size of the resulting concentrated coating composition. The results were shown in Table 1 as Example 7 to 10.

Similarly, Comparative Example 2 was conducted in the same way as described in Example 6, with the exception of using the coating composition obtained from Comparative Example 1. Example 6 was also repeated to prepare the diluted solution of the coating composition and then concentrate it, except that the coating composition obtained from Example 4 or 5 was employed (Comparative Examples 3 and 4). Each dielectric constant of the collecting solutions used in Comparative Examples 3 and 4 was adjusted to not less than 70.

Each solid content of the diluted coating composition and the collecting solution, chemical properties of the collecting solution, a time taken to reach to a given solid content of the coating composition during concentrating and the solid content and particle size of the concentrated coating composition are shown in Table 1.

The results are shown in Table 2.

(ii) Salt spray resistance (JIS K-5400-9)

Each of the cold curing aqueous coating compositions (A) to (E), the aqueous coating composition obtained from Comparative Example 1, and the concentrated coating compositions obtained from Examples 6 to 10 and Comparative Examples 2 to 4 was spray coated onto a dall steel plate in a thickness of 25 to 30 μm and dried at 80° C. for 20 minutes, followed by leaving it for a week at ambient temperature. Thereafter, the coated plate was subjected to a test for evaluating salt spray resistance according to Standard Method of JIS K-5400-9. The resistance was determined by measuring a time taken to be the stripped coating film width of above 3 mm from the coated plate.

TABLE 1

| | Coating composition | Solid content[1] (%) | Solid content[2] (%) | Properties of the collecting solution | A time taken to reach to the following solid content (minute) | | | | Solid content[4] (%) | Particle size (μm) |
|---|---|---|---|---|---|---|---|---|---|---|
| | | | | | 10(%) | 25(%) | 40(%) | On finishing concentrating | | |
| Example 6 | (A) [obtained from Example 1] | 58 | 10 | $\epsilon^{3)} = 65$ pH = 9.0 | 0 | 100 | 200 | 300 | 60 | ≦15 |
| Example 7 | (B) [obtained from Example 2] | 55 | 10 | $\epsilon^{3)} = 65$ pH = 9.0 | 0 | 180 | 320 | 400 | 55 | ≦15 |
| Example 8 | (C) [obtained from Example 3] | 54 | 10 | $\epsilon^{3)} = 24$ pH = 9.5 | 0 | 100 | 190 | 330 | 54 | ≦15 |
| Example 9 | (D) [obtained from Example 4] | 65 | 8 | $\epsilon^{3)} = 50$ pH = 9.0 | 20 | 150 | 300 | 450 | 65 | ≦15 |
| Example 10 | (E) [obtained from Example 5] | 43 | 15 | $\epsilon^{3)} = 30$ pH = 8.5 | — | 80 | 250 | 360 | 44 | ≦15 |
| Comparative Example 2 | (C1) [obtained from Comparative Example 1] | 45 | 10 | deionized water $\epsilon^{3)} = 79.4$ | 0 | 150 | 300 | 450 | 45 | 40 |
| Comparative Example 3 | (E) [obtained from Example 5] | 43 | 15 | ** $\epsilon^{3)} = 72$ | — | 200 | These were not measurable because of precipitating and aggregating. | | | |
| Comparative Example 4 | (D) [obtained from Example 4] | 65 | 8 | deionized water $\epsilon^{3)} = 79.4$ | 20 | 220 | 400 | 600 | 60 | ≧50 |

Note:

1): Solid content of the diluted solution of the coating composition,

2): Solid content of the collected coating composition by using the collecting solution, 3): A dielectric constant (ε), 4): Solid content of the concentrated coating composition on finishing concentrating, and

**: Butyl cellosolve 1.0%, pH was adjusted to 9.0 with triethylamine.

Evaluation of appearance of coating film (i) Resistance to hot water (JIS K-5400-8)

Each dall steel plate having the coating formed was immersed into hot water at a temperature of 40° C. for 10 days. Blisters generated on a surface of the coating were observed and a time taken to generate them (in hour) was measured.

The results are shown in Table 2.

TABLE 2

| | Appearance of coating film | |
|---|---|---|
| Coating composition | (i) Resistance to hot water (hour) | (ii) Salt spray resistance (hour) |
| (A): obtained from Example 1 | 72 | 180 |
| (B): obtained from Example 2 | 96 | 180 |
| (C): obtained from Example 3 | 150 | 270 |
| (D): obtained from Example 4 | 48 | 120 |
| (E): obtained from Example 5 | 48 | 120 |
| (C1): obtained from Comparative Example 1 | 24 | 48 |
| Concentrated coating composition: obtained from Example 6 | 90 | 180 |
| Concentrated coating composition: obtained from Example 7 | 120 | 180 |
| Concentrated coating composition: obtained from Example 8 | 150 | 270 |
| Concentrated coating composition: obtained from Example 9 | 48 | 120 |
| Concentrated coating | 48 | 120 |

TABLE 2-continued

| Coating composition | Appearance of coating film | |
|---|---|---|
| | (i) Resistance to hot water (hour) | (ii) Salt spray resistance (hour) |
| composition: obtained from Example 10 | | |
| Concentrated coating composition: obtained from Comparative Example 2 | 24 | 48 |
| Concentrated coating composition: obtained from Comparative Example 3* | — | — |
| Concentrated coating composition: obtained from Comparative Example 4 | 24 | 48 |

*It was impossible to concentrate.

Recyclability of Filtrate

The dielectric constant of the filtrate separated from concentrating the diluted solution of the coating composition as described in Example 6 and properties of the resulting concentrated coating composition obtained in the same way as described in Example 6, with the exception of using the filtrate as the collecting solution to collect the cold curing aqueous coating composition (A) obtained from Example 1, were determined in the same way as described in Example 6. The results are shown in Table 3.

In connection with each cold curing aqueous coating composition (B), (C), (D) or (E) obtained from Examples 6 to 10, the same procedure and evaluation as the above mentioned was conducted. Each result is shown in Table 3.

obtained from Example 8 to yield a diluted solution of the coating composition. Then, the diluted solution was subjected to filtrating and concentrating again. Properties of the twice-concentrated coating composition were determined in the same way as described in Example 6.

The procedure including filtrating and concentrating was repeated 10 cycles by using the same coating composition and filtrate as mentioned above. Properties of the 10 cycles-concentrated coating composition were determined in the same way as described in Example 6.

The results and the dielectric constant of the filtrate were shown in Table 4.

TABLE 4

| | | | Appearance of coating film | |
|---|---|---|---|---|
| Coating composition | Filtrate | | (i) Resistance to hot water (hour) | (ii) Salt spray resistance (hour) |
| Concentrating twice | Example 8 | Example 8 (dielectric constant = 41) | 150 | 240 |
| Concentrating 10 cycles | Concentrating 9 cycles | Concentrating 9 cycles (dielectric constant = 36) | 150 | 240 |

Measuring the dielectric constant of the collecting solution expressed in Table 3 and 4 was conducted according to the following procedure:

TABLE 3

| | | | | | | | Appearance of coating film | |
|---|---|---|---|---|---|---|---|---|
| Filtrate | Coating composition | Solid content[1] (%) | Solid content[2] (%) | Dielectric constant | Solid content[3] (%) | Particle size (μm) | (i) Resistance to hot water (hour) | (ii) Salt spray resistance (hour) |
| Example 6 | (A): obtained from Example 1 | 58 | 10 | 40 | 60 | ≦15 | 90 | 180 |
| Example 7 | (B): obtained from Example 2 | 55 | 10 | 48 | 55 | ≦15 | 120 | 180 |
| Example 8 | (C): obtained from Example 3 | 54 | 10 | 36 | 54 | ≦15 | 180 | 300 |
| Example 9 | (D): obtained from Example 4 | 65 | 8 | 48 | 65 | ≦15 | 48 | 120 |
| Example 10 | (E): obtained from Example 5 | 43 | 15 | 28 | 44 | ≦15 | 48 | 120 |
| Example 6 | (C): obtained from Example 3 | 54 | 10 | 40 | 54 | ≦15 | 180 | 300 |

Note:
1): Solid content of the diluted solution of the coating composition,
2): Solid content of the collected coating composition by using the corresponding filtrate, and
3): Solid content of the concentrated coating composition.

Example 11 (Repeating concentration)

Figure 2:
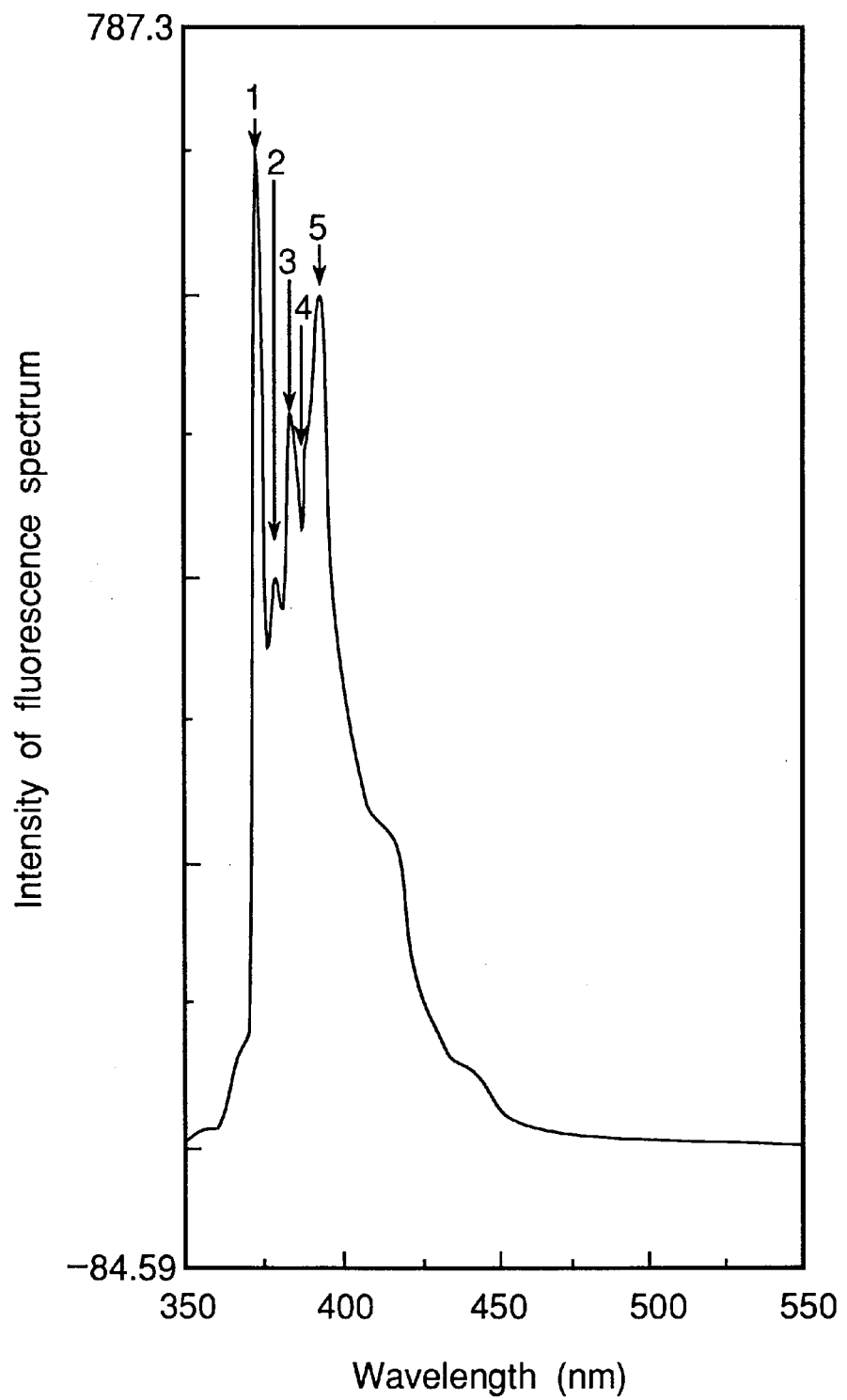
FIG. 2 shows a graph of a fluorescence spectrum of a solution of pyrene in methanol, of which longitudinal axis expresses an intensity of fluorescence spectrum and transverse axis expresses a number of wavelength (nm).

The cold curing aqueous coating composition (C) obtained from Example 8 was diluted with the filtrate Pyrene was dissolved in each of water and organic solvents including methanol, ethanol, 1-propanol, 1-butanol and 2-butanol to prepare a pyrene solution having a concentration of $1 \times 10^{-5}$ M, respectively. A fluorescence spectrum of each of the pyrene solutions was measured by using fluorescence spectroscope FP-777 (which is manufactured by JASCO CORPORATION) at an excited wavelength of 320 nm. Among the results, the fluorescence spectrum of the pyrene solution in methanol is representatively shown in FIG. 2. In FIG. 2, each of arrows and numeric letters shows the first, second, third, fourth or fifth peak In FIG. 2, the intensity ratio of the fluorescence spectrum: $I_1/I_3$ was calculated by dividing the intensity of the first peak ($I_1$) at 373 nm (in the case of using methanol, 700.1) by the intensity of the third peak ($I_3$) at 384 nm (e.g. 515.1).

TABLE 5

| Solvent | $I_1/I_3$ | Dielectric constant |
|---|---|---|
| Water | 1.87 | 78.3 |
| Methanol | 1.36 | 33.1 |
| Ethanol | 1.22 | 23.8 |
| 1-Propanol | 1.10 | 22.1 |
| 1-Butanol | 1.05 | 17.1 |
| 2-Butanol | 1.01 | 15.5 |

Figure 3:
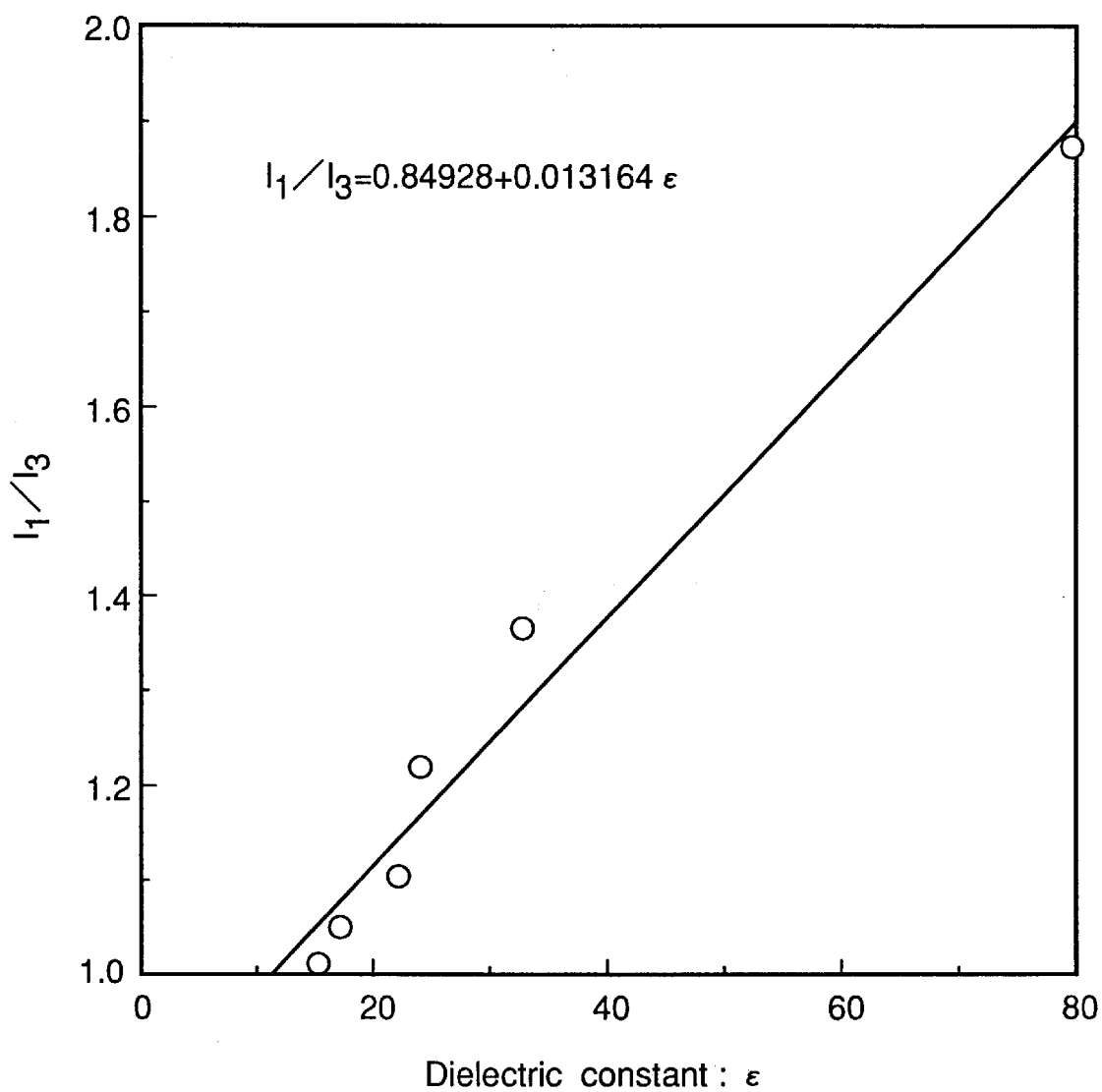
FIG. 3 shows a relationship between an intensity ratio $I_1/I_3$ of the first peak ($I_1$) and the third peak ($I_3$) referring to the fluorescence spectrum of each of solutions of pyrene in kinds of solvents and a dielectric constant $\epsilon$ of the corresponding solvent.

Thereafter, the dielectric constant of each of the corresponding solvents was looked up in the publication: "Handbook of solvents" (published by KODANSHA in 1976). A relationship between the intensity ratio $I_1/I_3$ and the dielectric constant concerning each solution is shown in FIG. 3. By using the relationship, the dielectric constant of each of the collecting solutions in connection with Examples and Comparative Examples as described hereinbefore w as calculated.

Method for Determining the Dielectric Constant

Pyrene was dissolved in ethanol to prepare a pyrene solution having a concentration of $1 \times 10^{-2}$ M. 0.1 g of the pyrene solution in ethanol was added to 99.9 g of the collecting solution as described in Example 1 and shaken to obtain a heterogeneous solution. This solution was charged into a triangular quartz cell having a bottom dimension of 1 cm², and then subjected to surface fluorescence spectroscopy at an excited wavelength of 320 nm by using fluorescence spectroscope FP-777 (which is manufactured by JASCO CORPORATION) to measure a fluorescence spectrum, and then, the intensity ratio $I_1/I_3$ of 1.70 was calculated. The dielectric constant $\epsilon$ of the collecting solution as described in Example 1 was determined by assigning the intensity ratio of 1.70 to the relationship expressed in FIG. 2. The dielectric constant was 65.

Spectroscope

In the present invention, the fluorescent exploratory material (e.g. the above pyrene solution in ethanol) was added to the collecting solution to measure a fluorescence spectrum of the solution containing the coating composition and the fluorescent exploratory material.

Examples of a fluorescence analyzer used in measuring the fluorescence spectrum as above mentioned include a fluorescence spectroscope and the like, but not being construed to be limited thereto. A commercially available fluorescence spectroscope, such as FP-777, FP-750 (both of which are manufactured by JASCO CORPORATION), F-2000, F-4500 (both of which are manufactured by HITACHI, LTD.), RP-1500 (which is manufactured by SHIMADZU CORP.) and the like, can be also employed in the present invention.

What is claimed is:

1. A recyclable cold curing aqueous coating composition, comprising:
    (a) an oxidative-polymerizable, modified epoxy resin with an acid value of 25 to 60, comprising 20 to 70 percents by weight of an epoxy resin based on the total weight of said modified epoxy resin, of which a particle size is not more than 200 nm in an aqueous medium;
    (b) an anticorrosive pigment and/or an ampholytic metal oxide; and
    (c) a drier.

2. A recyclable cold curing aqueous coating composition according to claim 1, wherein said oxidative-polymerizable, modified epoxy resin (a) is an acrylic group-modified epoxy resin.

3. A recyclable cold curing aqueous coating composition according to claim 1, wherein said oxidative-polymerizable, modified epoxy resin (a) has an iodine value of 30 to 100.

4. A recyclable cold curing aqueous coating composition according to claim 1, wherein said ampholytic metal oxide (b) is contained in an amount of 0.1 to 15 parts by weight based on 100 parts by weight of a solid content of the oxidative-polymerizable, modified epoxy resin (a) in said coating composition.

5. A method for recycling a recyclable cold curing aqueous coating composition, which comprises the following steps:
    i) collecting the cold curing aqueous coating composition which has not been coated on an article in a coating booth by using a collecting solution;
    ii) filtering and concentrating the collected coating composition to separate into a concentrated coating composition and a filtrate; and
    iii) recycling the concentrated coating composition to be used as the recyclable cold curing aqueous coating composition, and recycling the filtrate to be used as the collecting solution, wherein said recyclable cold curing aqueous coating composition comprising:
        (a) an oxidative-polymerizable, modified epoxy resin with an acid value of 25 to 60, comprising 20 to 70 percents by weight of an epoxy resin based on the total weight of said modified epoxy resin, of which a particle size is not more than 200 nm in an aqueous medium;
        (b) an anticorrosive pigment and/or an ampholytic metal oxide; and
        (c) a drier,
    said collecting solution having a dielectric constant of 20 to 70.

6. A method for recycling a recyclable cold curing aqueous coating composition according to claim 5, wherein said oxidative-polymerizable, modified epoxy resin (a) is an acrylic group-modified epoxy resin.

7. A method for recycling a recyclable cold curing aqueous coating composition according to claim 5, wherein said oxidative-polymerizable, modified epoxy resin (a) has an iodine value of 30 to 100.

8. A method for recycling a recyclable cold curing aqueous coating composition according to claim 5, wherein said collecting solution comprises at least one selected from the group consisting of a water-soluble organic solvent, an organic solvent which is miscible with the water-soluble organic solvent, a surfactant, a resin used in the recyclable cold curing aqueous coating composition as a starting material.

9. A method for recycling a recyclable cold curing aqueous coating composition according to claim 5, wherein said dielectric constant is determined by using fluorescence spectrum analysis.

* * * * *